United States Patent [19]

Yamazaki et al.

[11] Patent Number: 5,308,574
[45] Date of Patent: May 3, 1994

[54] METHOD OF INJECTION MOLDING WITH AIR ASSIST FOR MAKING A HANDLE-SHAPED MOLDED ARTICLE

[75] Inventors: Kunio Yamazaki; Akimasa Kaneishi, both of Hiratsuka; Yoshiharu Ohtuki, Yokkaichi; Akinori Toyota, Hiratsuka, all of Japan

[73] Assignee: Mitsubishi Gas Chemical Company, Inc., Tokyo, Japan

[21] Appl. No.: 877,425

[22] Filed: May 1, 1992

[30] Foreign Application Priority Data

May 8, 1991 [JP] Japan .................. 3-132010

[51] Int. Cl.[5] ............................................. B29C 45/18
[52] U.S. Cl. ........................................ 264/572; 425/130
[58] Field of Search ............... 264/85, 572, 328.8; 425/130

[56] References Cited

U.S. PATENT DOCUMENTS

| | | | |
|---|---|---|---|
| 3,873,656 | 3/1975 | Garner | 264/328.8 |
| 4,740,150 | 4/1988 | Sayer | 264/572 |
| 4,824,732 | 4/1989 | Hendry | 264/572 |
| 4,855,094 | 8/1989 | Hendry | 264/328.8 |
| 4,923,666 | 5/1990 | Yamazaki et al. | 264/572 |
| 4,964,217 | 10/1990 | Siede et al. | |
| 5,030,076 | 7/1991 | Ebenhofer et al. | 264/572 |
| 5,044,924 | 9/1991 | Loren | 264/572 |
| 5,047,183 | 9/1991 | Eckardt et al. | 264/572 |
| 5,114,660 | 5/1992 | Hendry | 264/572 |
| 5,135,703 | 8/1992 | Hunerberg et al. | 264/328.8 |

FOREIGN PATENT DOCUMENTS

| | | |
|---|---|---|
| 0289230 | 11/1988 | European Pat. Off. . |
| 4102319 | 8/1991 | Fed. Rep. of Germany . |
| 2629749 | 10/1989 | France . |
| 56-056832 | 5/1981 | Japan .................. 264/572 |
| 57-14968 | 3/1982 | Japan . |
| 61-53208 | 11/1986 | Japan . |
| 2158002 | 11/1985 | United Kingdom . |

OTHER PUBLICATIONS

Patent Abstracts of Japan, 15(45) (Feb. 4, 1991) (M1077) abstracting JP-A-2282052.
Modern Plastics International, 20(12) 30-31 (Nov. 1990).
Plastiques Modernes et Elastomeres, 43(10) 60-62 (Dec. 1991).

Primary Examiner—Catherine Timm
Attorney, Agent, or Firm—Wenderoth, Lind & Ponack

[57] ABSTRACT

A method for producing a handle-shaped molded article (1) having a thick grip portion (2) and at least one thick fitting portion (3) by injection molding using an injection molding apparatus (10) equipped with a mold having a cavity (60), a resin gate (46) provided in a portion (62) where the fitting portion is to be formed and a gas inlet (48) provided in a portion (64) where the grip portion is to be formed. A hollow structure (4) is formed in the grip portion (2) and a solid structure is formed in the fitting portion (3) by injecting a molten resin into the cavity (60) through the resin gate (46), thereby filling molten resin in a fitting portion-forming cavity zone formed of that portion (62) of the mold where the resin gate is provided and the fitting portion is to be formed and further filling molten resin in part of the rest of the cavity. A pressurized gas is introduced into the cavity (60) through the gas inlet (48) while maintaining an injection pressure, P, at a predetermined value, the injection pressure, P, being defined by $$P = F/S$$

wherein P is an injection force and S is a cross-sectional area of a screw (12) of the injection molding apparatus, and maintaining the injection pressure and gas pressure in the gas inlet (48) at predetermined values until the molten resin is cooled and solidified.

7 Claims, 5 Drawing Sheets

METHOD OF INJECTION MOLDING WITH AIR ASSIST FOR MAKING A HANDLE-SHAPED MOLDED ARTICLE

BACKGROUND OF THE INVENTION AND RELATED ART

The present invention relates to a handle-shaped molded article having the form of a handle, a drawer pull, a knob, or the like (to be referred to as "handle" hereinafter) used for opening and closing the door, etc., of an automobile, an electric appliance, a building, and the like, a method of injection molding of the handle-shaped article, and a mold suitable for molding the handle-shaped molded article. More specifically, it relates to a handle-shaped molded article of which the grip portion has an excellent appearance and the fitting portion has high strength, a method of injection molding the same, and a mold suitable for molding such a handle-shaped molded article.

A handle-shaped part having a thick grip portion and thick fitting portion(s) is fixed to a door, etc., of an automobile, an electric appliance or a building, and is used to open the door. Such a handle-shaped part is required to be light in weight as a whole. The grip portion is evaluated on its appearance, and is required to be free from a sink mark and distortion. Further, the fitting portion of the handle-shaped part is required to have high strength.

A thick part can be generally produced by a foam molding method. When a handle-shaped part is produced by the foam molding method, however, cellules remain on the surface of the handle-shaped part, and it is therefore difficult to produce an excellent appearance. Further, since cells remain in the interior of the fitting portion, the strength of the fitting portion is insufficient. Furthermore, in the foam molding method, when a molten resin and a foam are mixed, a long period of time is required for cooling, and the molding cycle takes longer.

On the other hand, there is known another foaming technique in which a molded article is obtained by first injecting a molten resin containing no foaming agent into a cavity provided in a mold and then injecting a molten resin containing a foaming agent into the cavity. A molded article produced by this technique has an excellent appearance, since the surface layer of the molded article is formed from a resin containing no foaming agent. However, in the production of a handle-shaped part by such a technique, the structure of the injection molding apparatus and the molding conditions are complicated, and the molding cycle also takes longer.

U.S. Pat. No. 4,101,617 or JP-B-57-14968 discloses a method in which a pressurized gas is applied to a molten resin injected into a cavity provided in a mold to produce an injection molded article having a hollow structure. Further, JP-B-61-53208 discloses an injection molded article having a hollow portion extending non-uniformly from that portion of the molded article which corresponds to a resin gate, and a method in which such an injection molded article is produced.

In the method of any one of U.S. Pat. No. 4,101,617, JP-B-57-14968 and JP-B-61-53208, a gas inlet is provided in a resin nozzle portion. Therefore, when a resin gate is provided in that portion of the mold where the fitting portion of a handle-shaped molded article is to be molded and the handle-shaped molded article is produced according to these methods by using such a mold, it is difficult to form a fitting portion having a solid structure, and the fitting portion cannot exhibit high strength. Further, when a resin gate is provided in that portion of the mold where the grip portion of the handle-shaped molded article is to be molded, the hollow portion of the grip portion extends toward the fitting portion although the extension depends upon the shape of the handle-shaped molded article, and it is difficult to accurately form a solid structure of the fitting portion.

In the above method of any one of the above three publications, after a molten resin in an amount insufficient to fill a cavity is injected, or while a molten resin is being filled into a cavity, a pressurized gas is introduced into the cavity through the gas inlet provided in the resin nozzle portion, and then the molten resin is cooled and solidified. However, nothing is described or suggested concerning the relationship between the resin pressure and the gas pressure while the molten resin is cooled and solidified.

JP-A-60-24913 (corresponding to U.S. Pat. No. 4,824,732) and JP-A-64-14012 (corresponding to U.S. Pat. No. 4,740,150) describe a method in which an injection molded article having a hollow structure is produced by applying a pressurized gas from the center of a cavity to a molten resin, an injection molding apparatus used therefor.

In one embodiment of JP-A-60-24913, as soon as a molten resin introduced into a cavity passes the outlet of a gas passage and closes the outlet, a pressurized gas is introduced into the molten resin from the gas passage, whereby a hollow portion is formed in the molded article. In this embodiment, however, it is very difficult to form a handle-shaped molded article having a hollow structure. That is because the pressurized gas, which has been introduced into the molten resin through the outlet of the gas passage as soon as the molten resin has closed the outlet of the gas passage, blows away the molten resin which has been introduced to that portion of the cavity where a grip portion having a large cross section is to be formed.

In one embodiment of JP-A-24913, a screw ram of an injection molding machine is held on in a forward end of a stroke while a molten resin is cooled and solidified. However, JP-A-24913 neither describes nor suggests anything concerning the relationship between the pressure for controlling the screw ram and the pressure of a pressurized gas. If the screw ram is allowed to stay in a forward end without applying any pressure to the screw ram and a pressurized gas is introduced into a molten resin introduced into a cavity, the molten resin which has been introduced into the cavity is pushed back into a resin gate by the pressurized gas. As a result, not only a grip portion becomes hollow, but also the molten resin is sometimes pushed back into the resin nozzle portion of an injection molding apparatus, thereby pushing back the screw ram.

JP-A-14012 discloses a method in which a sliding valve provided in a resin nozzle portion of the injection molding apparatus is closed. This method seems to prevent the counterflow of a molten resin injected into a cavity toward a resin gate and the formation of a hollow portion within a fitting portion. When the sprue portion and the runner portion have a large volume, however, a molten resin present in the sprue portion and the runner portion contract during its cooling and solidification, and a hollow portion is likely to be formed in the fitting portion due to the pressurized gas. Even the sprue portion and the runner portion are liable to become hollow in some cases. As a result, the resultant fitting portion has insufficient strength.

JP-A-268611 (corresponding to U.S. Pat. No. 4,923,666) discloses a method in which an injection molded article having a hollow structure is produced by introducing a pressurized gas into a molten resin. In this method, a molten resin is injected into a cavity in such an amount that it occupies the entire volume of the cavity. It is therefore difficult to apply this method to the production of a handle-shaped molded article having a thick grip portion and a large-volume hollow portion.

OBJECTS AND SUMMARY OF THE INVENTION

It is an object of the present invention to provide a handle-shaped molded article of which the fitting portion has high strength and the grip portion has excellent appearance.

It is another object of the present invention to provide a method for injection molding such a handle-shaped molded article.

It is further another object of the present invention to provide a mold suitable for molding such a handle-shaped molded article.

The above objects and advantages of the present invention are achieved by a first aspect of the present invention, i.e., a method for producing a handle-shaped molded article having a thick grip portion having a hollow structure and at least one thick fitting portion having a solid structure by injection molding by means of an injection molding apparatus equipped with a mold having a cavity, a resin gate provided where the fitting portion of the handle-shaped molded article is to be formed and a gas inlet provided where the grip portion of the handle-shaped molded article is to be formed, which comprises:

injecting a molten resin into the cavity through the resin gate, thereby filling molten resin in a fitting portion-forming cavity zone formed of that portion of the mold where the resin gate is provided and the fitting portion is to be formed and further filling molten resin in part of the rest of the cavity, introducing a pressurized gas into the cavity through the gas inlet while maintaining an injection pressure, P, at a predetermined value, the injection pressure, P, being defined by $$P = F/S$$

wherein F is an injection force and S is a cross-sectional area of a screw of the injection molding apparatus, and maintaining the injection pressure and a gas pressure in the gas inlet at predetermined values until the molten resin is cooled and solidified.

In a preferred embodiment of the first aspect of the present invention directed to the process for the production of the above-specified handle-shaped molded article by injection molding, the injection pressure is maintained at 0.5 or more times, preferably 0.5 to 2.5 times the gas pressure in the gas inlet during a time from the initiation of the introduction of the pressurized gas to the completion of cooling and solidification of the molten resin. In this case, the injection pressure may be maintained at a predetermined value while the injection ram of the injection molding apparatus is held on in a forward end position. Alternatively, the relationship between the pressure of the pressurized gas and the molding state of the handle-shaped molded article being considered, the injection pressure may be maintained at a predetermined value while a small amount of the molten resin is retained in front of the screw of the injection molding apparatus. When the injection pressure is less than the above lower limit, a hollow structure may be formed in the fitting portion. When the injection pressure is higher than the above upper limit, the molten resin may flow into the grip portion to form a solid structure in a part of the grip portion in which the hollow structure has been formed.

In the production of the handle-shaped molded article of which the fitting portion and the grip portion are integrally formed, it is preferred to introduce the pressurized gas into the molten resin after a considerable amount of the molten resin is introduced into the cavity, at a time when the introduction of the molten resin into the cavity is completed, or after the introduction is completed.

More specifically, in a preferred embodiment of the first aspect of the present invention, the introduction of the pressurized gas into the cavity through the gas inlet is initiated after the molten resin has been injected in an amount corresponding to $0.3 \times (V_t - V_1)$, more preferably $0.5 \times (V_t - V_1)$, in which $V_t$ is the total volume of the molten resin to be injected and $V_1$ is the volume of the fitting portion-forming cavity zone.

The above objects and advantages of the present invention are achieved by a second aspect of the present invention, i.e., a method for producing a handle-shaped molded article having a thick grip portion having a hollow structure and at least one thick fitting portion having a solid structure by injection molding by means of an injection molding apparatus equipped with a mold having a cavity, a resin gate provided where the fitting portion of the handle-shaped molded article is to be formed and a gas inlet provided where the grip portion of the handle-shaped molded article is to be formed, which comprises:

injecting a molten resin into the cavity through the resin gate, thereby filling molten resin in a fitting portion-forming cavity zone formed of that portion of the mold where the resin gate is provided and the fitting portion is to be formed and further filling molten resin in part of the rest of the cavity, mechanically closing the resin gate, then introducing a pressurized gas into the cavity through the gas inlet, and maintaining a gas pressure in the gas inlet at a predetermined value, with the resin gate mechanically closed, until the molten resin is cooled and solidified.

In a preferred embodiment of the second aspect of the present invention directed to the process for producing a handle-shaped molded article by injection molding, means for mechanically closing the resin gate is selected from a valve gate or a shut-off nozzle.

In a preferred embodiment of the second aspect of the present invention, the introduction of the pressurized gas into the cavity through the gas inlet is initiated after the molten resin has been injected in an amount corresponding to $0.3 \times (V_t - V_1)$, more preferably $0.5 \times (V_t - V_1)$, in which $V_t$ is the total volume of the molten resin to be injected and $V_1$ is the volume of the fitting portion-forming cavity zone.

The thermoplastic resin used in the method of the present invention is not specially limited, and can be selected from general-purpose plastic resins such as a polyolefin resin, a polystyrene resin, an ABS resin, an AS resin, a PVC resin, a methacrylic resin and a fluorine-containing resin and engineering plastic resins such as a nylon resin, a saturated polyester resin, a polycarbonate resin, a polyacrylate resin, a polyacetal resin, a polysulfone resin and a modified polyphenylene ether resin.

A reinforcing fibrous material, a filler, a stabilizer, etc., may be incorporated to the thermoplastic resin as required.

In carrying out the method of the present invention, a variety of conditions such as the amount, temperature, pressure and injection rate of the molten resin in injection molding, the amount, pressure and feeding rate of the gas, and the cooling time of the mold cannot be uniformly determined, since these conditions are required to be properly selected and controlled depending upon the kind of the resin used and the form of the mold.

The gas to be introduced is selected not only from gaseous substances at room temperature such as a nitrogen gas, a carbonic acid gas, air and a helium gas but also from liquefied gases under high pressure.

Further, the above objects and advantages of the present invention can be achieved by a mold for producing a handle-shaped molded article having a thick grip portion having a hollow structure and at least one thick fitting portion having a solid structure, the mold having a resin gate provided where the fitting portion of the handle-shaped molded article is to be formed and a gas inlet provided where the grip portion of the handle-shaped molded article is to be formed.

In one preferred embodiment of the above mold, the mold may be provided with means for mechanically closing the resin gate. The closing means may be, for example, a valve gate provided in a hot runner portion or a shut-off nozzle provided in a resin nozzle portion.

The above objects and advantages of the present invention can be also achieved by a handle-shaped molded article of which the thick grip portion and at least one thick fitting portion are integrally formed, the thick fitting portion having a solid structure, the thick grip portion having a hollow structure. Such a handle-shaped molded article has not yet been known. The handle-shaped molded article is installed in, mounted on, or fixed to a door, etc., of an automobile, an electric appliance, a building, or the like. The handle-shaped molded article is generally used in such a manner that people hold the grip portion to open or close the door, etc. The handle-shaped molded article generally has the form of a handle, a drawer pull, a knob, or the like.

According to the present invention, the fitting portion of the handle-shaped molded article exhibits high strength since it has a solid structure. On the other hand, the grip portion of the handle-shaped molded article has a hollow structure. Therefore, the total weight of the handle-shaped molded article as a whole can be decreased. Moreover, the grip portion has a smooth surface and an excellent appearance, since the surface of the grip portion is pressed to the interior surface of the mold during the cooling and solidification of the molten resin. The above objects and advantages and other advantages of the present invention will be also apparent from the following description.

DESCRIPTION OF THE PREFERRED EMBODIMENTS

The present invention will be further detailed by reference to drawings.

The handle-shaped molded article of the present invention, i.e., a handle-shaped molded article of which the thick grip portion and the thick fitting portion(s) are integrally formed, the thick fitting portion(s) has (have) a solid structure and the thick grip portion has a hollow structure, can be specifically produced by the following process. The handle-shaped molded article may have one or more fitting portions.

Figure 1:
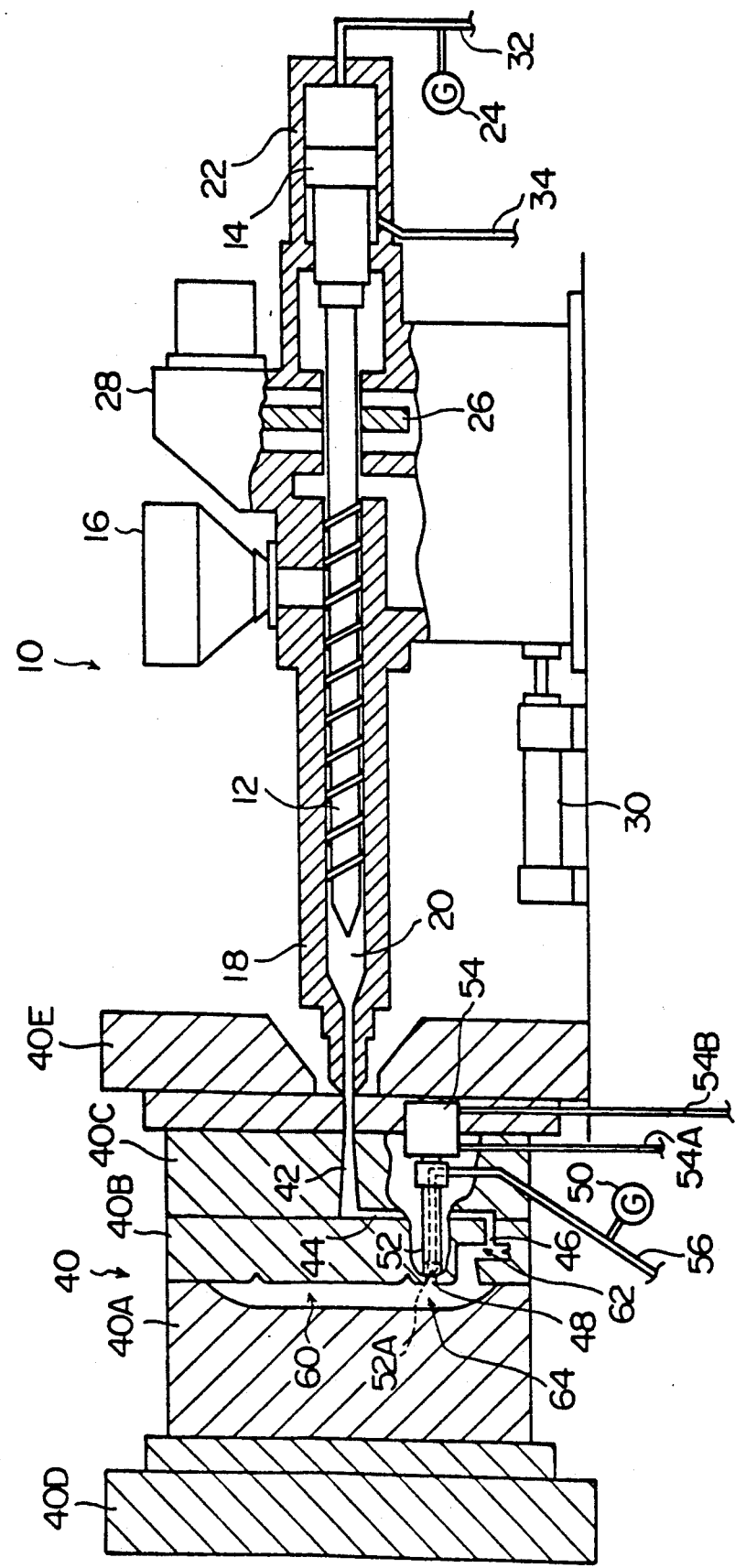
FIG. 1 is a schematic view showing the arrangement of a mold and an injection molding apparatus.

As shown in FIG. 1, the method of the present invention uses a mold having a resin gate provided in at least one place in a mold 40 where the fitting portion of a handle-shaped molded article is to be formed and a gas inlet provided where the grip portion of the handle-shaped molded article is to be formed. The gas inlet 48 is connected to a high-pressure gas source (not shown) through a gas piping 56, and the pressure (a gage-pressure) of a gas being introduced to a cavity 60 is measured with a pressure gage 50. The pressure found by measurement with the pressure gage 50 is defined as a pressure of a pressurized gas in the gas inlet. The gas inlet 48 is constituted from a gas inlet nozzle 52, and the gas inlet nozzle 52 is moved forward and backward with a hydraulic gas inlet nozzle actuation cylinder 54. When the pressurized gas is introduced into the cavity, the gas inlet nozzle 52 stays in a forward position. When the pressurized gas is discharged from the cavity, it stays in a backward position. Numerals 54A and 54B show hydraulic oil pipings for the hydraulic gas inlet nozzle actuation cylinder 54. A check valve 52A is provided in the forward end portion of the gas inlet nozzle 52 for preventing molten resin from penetrating the gas inlet nozzle 52.

A resin gate 46 is provided in a place distant from where the grip portion is to be formed in the mold. As a result, not only the grip portion eventually has an excellent appearance, but a fitting portion also has high strength. Furthermore, handle-shaped molded articles are excellently replicated with the mold. When a handle-shaped molded article has two or more fitting portions, one resin gate may be provided in one place in the mold where one fitting portion is to be formed. Further, a resin gate may be also provided in other place(s) in the mold where other fitting portion/portions is/are formed.

The mold 40 is formed of mold elements 40A, 40B and 40C. The mold element 40A is attached to a plate 40D, and the mold elements 40B and 40C are attached to a plate 40E.

The cavity 60 in the mold 40 has a fitting portion-forming cavity zone formed of that portion of the mold where the fitting portion of the handle-shaped molded article is to be formed and the resin gate is provided, and other cavity zone. The above "other cavity zone" includes a grip portion-forming cavity zone formed of that portion of the mold where the grip portion of the handle-shaped molded article is to be formed.

Figure 2:
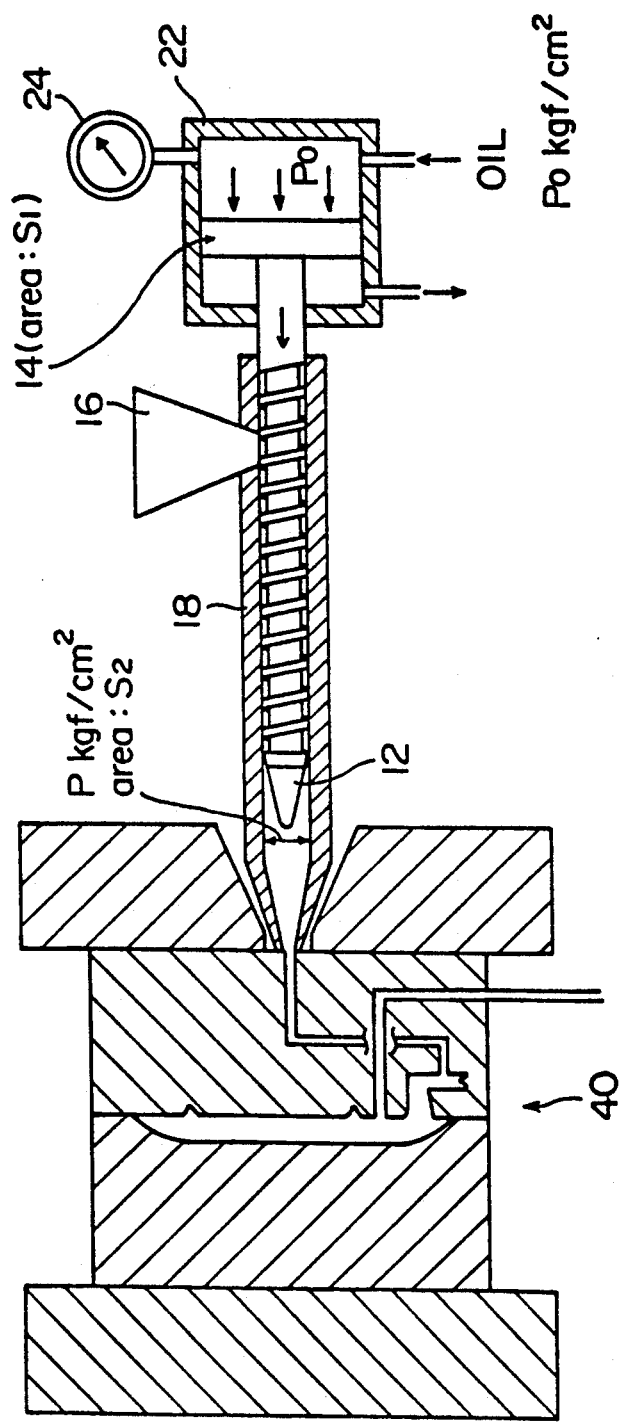
FIG. 2 is a schematic view showing the relationship of pressures in some portions of an injection molding apparatus.

As shown in FIG. 1, the method of the present invention uses, as an injection molding apparatus 10, an in-line screw type injection molding apparatus in which a screw 12 plasticizes a molding material and works as a plunger. The screw 12 is rotated by a hydraulic motor 28 through a reduction gear 26. A molding material is fed onto the screw 12 through a hopper 16, and fed forward while it is heated and plasticized with a heating cylinder 18 and the screw 12. The resultant molten resin is accumulated in a gap 20 formed between the heating cylinder 18 and the forward end of the screw 12. An injection ram 14 is provided in the backward end of the screw 12, and actuated with a hydraulic injection cylinder 22. When the hydraulic injection cylinder 22 exerts a pressure on the injection ram 14, the screw 12 is pushed forward to exert a pressure on the molten resin. The molten resin accumulated in the gap 20 passes through a sprue portion 42, a runner portion 44 and the resin gate 46 provided in the mold 40, and is introduced into the cavity 60. As shown in FIG. 2, the pressure being applied to the hydraulic injection cylinder 22 is measured with a pressure gage 24. In addition, in FIG. 1, the view of the mold 40 is an enlarged view relative to the injection molding apparatus 10, numeral 30 shows a cylinder for moving the injection unit forward and backward, and numerals 32 and 34 show hydraulic pipings.

In the injection molding apparatus shown in FIG. 1, an electric motor can be replaced by the injection ram 14 and the hydraulic injection cylinder 22. The screw 12 is pushed forward by a driving force of the electric motor to exert a pressure on the molten resin.

The injection pressure, P, is defined by the following equation.

$$P = F/S$$

In the above equation, F is an injection force and S is a cross-sectional area of the screw 12.

When the injection molding machine shown in FIG. 1 is used, the injection force F is defined by the following equation.

$$F = S_0 \times P_0$$

In the above equation, $P_0$ is a pressure (a gage-pressure) applied to the hydraulic injection cylinder 22, and measurable with the pressure gage 24, and $S_0$ is a cross-sectional area of the injection ram 14. That is, $S_0/S$ is a ram ratio. Therefore, the injection pressure, P, is defined by the following equation.

$$P = S_0/S \times P_0$$

In the injection molding apparatus provided with the electric motor in place of the injection ram 14 and the hydraulic injection cylinder 22, the injection force F is a force of the electric motor which pushes forward the screw 12.

The gas inlet 48 is connected to a high-pressure gas source (not shown) provided outside the injection molding apparatus 10. The pressure of a gas being introduced into the cavity is measured with a pressure gage 50.

In the injection molding apparatus 10 shown in FIG. 1, a molten resin is injected into the cavity 60 through the resin gate 46 to occupy the fitting portion-forming cavity zone which is provided with the resin gate, and further to occupy part of the rest of the cavity. The fitting portion-forming cavity zone and the grip portion-forming cavity zone are continuously filled with the molten resin. It is therefore possible to prevent occurrence of jetting and a flow mark on the grip portion which is required to have an excellent appearance.

Thereafter, while the injection pressure, P, is maintained at a predetermined value, or after the resin gate is mechanically closed, a pressurized gas is introduced into the cavity 60, through the gas inlet 48. The introduction of the pressurized gas may be initiated while the molten resin is injected, at a time when the injection of the molten resin is completed, or after the injection of the molten resin is completed. Due to the introduced pressurized gas, the molten resin present in the rest of the cavity occupies a cavity zone in which no molten resin is filled. As a result, a continuous hollow portion is formed in the grip portion. The introduced pressurized gas also presses the molten resin to the internal surface of the mold.

Thereafter, the gas pressure in the hollow portion of the grip portion is maintained at a predetermined value with maintaining the injection pressure at a predetermined value or with the resin gate mechanically closed until the molten resin is cooled and solidified. The hollow portion of the grip portion is under pressure until the molten resin is cooled and solidified. Therefore, sink mark formation and distortion of the cooled and solidified article can be prevented.

When the sprue portion, the runner portion or the resin gate has a large volume, the pressurized gas may push back molten resin to the resin gate after the hollow portion of the grip portion is formed. In this case, the hollow portion formed in the grip portion extends into the fitting portion, i.e., a hollow portion is also formed in the fitting portion. As a result, the fitting portion exhibits insufficient strength. This phenomenon can be prevented by maintaining the gas pressure in the hollow portion of the grip portion at a predetermined value with maintaining the injection pressure at a predetermined value, or with the resin gate mechanically closed, until the molten resin is cooled and solidified.

In one preferred embodiment of the above procedure, the injection pressure is maintained at 0.5 or more times, preferably 0.5 to 2.5 times the gas pressure in the gas inlet during a time from the initiation of the introduction of the pressurized gas to the completion of cooling and solidification of the molten resin.

As an alternative method, the resin gate is mechanically closed after the injection of the molten resin is completed and during a time from the initiation of the introduction of the pressurized gas to the completion of the cooling and solidification of the molten resin, whereby the counterflow of the molten resin in the fitting portion toward the runner portion and the sprue portion can be prevented. The resin gate can be mechanically closed, for example, by closing the valve gate provided in the hot runner portion or the shut-off nozzle provided in the nozzle portion. The closing of the resin gate can effectively prevent the counterflow of the pressurized gas within the molten resin in the cavity from the resin gate to the runner portion.

Due to the above method, a pressure is also exerted on that fitting portion of the handle-shaped molded article which has a solid structure. As a result, the resin of the fitting portion is also cooled and solidified under pressure exerted from the interior of the resin to the internal surface of the mold, and eventually the fitting portion is free from distortion. Further, the fitting portion has no residual strain, and as a result, the handle-shaped molded article can be excellently plated. Moreover, the fitting portion has high strength and high rigidity.

After the resin is cooled and solidified, the introduced pressurized gas is discharged out of the mold, whereby the production of the handle-shaped molded article is completed.

EXAMPLE 1

Figure 3:
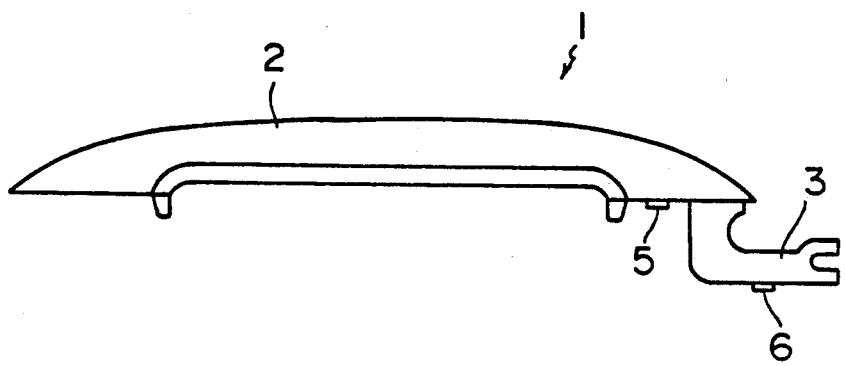
FIG. 3 is a side view of a handle-shaped molded article produced according to one embodiment of the method of the present invention.

A thick handle-shaped molded article having a volume of 78.2 cm$^3$ as a whole, as shown in FIG. 3, was produced. A grip portion 2 made up about 83% (64.9 cm$^3$) of the entire volume of the handle-shaped molded article, and a fitting portion 3 made up about 17% by volume (13.3 cm$^3$). In FIG. 3, numeral 5 indicates a gas inlet remainder, and numeral 6 indicates a resin gate remainder.

As shown in FIG. 1, a cavity 60 was made in a mold 40. A resin gate 46 was made in that portion 62 of the mold where the fitting portion 3 of the handle-shaped molded article 1 was to be formed, and a gas inlet 48 was made in that portion 64 of the mold where the grip portion 2 was to be formed. The cavity as a whole had a volume of 78.2 cm$^3$. The fitting portion-forming cavity zone had a volume of 13.3 cm$^3$, and the rest of the cavity, i.e., the grip portion-forming cavity zone, had a volume ($V_h$) of 64.9 cm$^3$.

A molten resin in an amount of 65.2 cm$^3$, which was polycarbonate plasticized at a resin temperature of 290° C., was injected into the cavity 60 through the resin gate 46 to fully occupy the fitting portion-forming cavity zone and also occupy about 80 volume % of the grip portion-forming cavity zone. After the injection of the molten resin was so finished, a nitrogen gas having a gage pressure of 30 kg/cm$^2$ was introduced into the cavity 60 through the gas inlet 48. In this case, a gage pressure of 5.85 kg/cm$^2$ was applied to an injection cylinder 22. The ram ratio was 13.3, and the injection pressure was set at 77.8 kg/cm$^2$(=5.85×13.3). The injection pressure/pressurized gas pressure ratio was 2.59(=77.8/30). Under these conditions, a hollow portion was formed in the grip portion.

With a gage pressure of 5.85 kg/cm$^2$ applied to the hydraulic injection cylinder 22, then, a nitrogen gas was further introduced, and at the same time, the pressure of the nitrogen gas was increased up to a gage pressure of 75 kg/cm$^2$. In this case, the injection pressure/pressurized gas pressure ratio was 1.04(=5.85×13.3/75). While these conditions were being maintained, the molten resin was cooled and solidified. Then, the nitrogen gas pressure in the hollow portion was reduced to atmospheric pressure, and the handle-shaped molded article was taken out of the mold.

Figure 4:
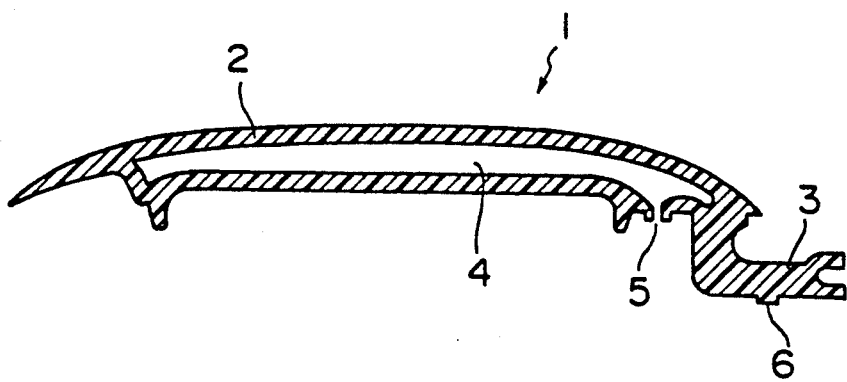
FIG. 4 is a cross-sectional view of the handle-shaped molded article shown in FIG. 3.

Under the above injection procedures, the handle-shaped molded article being indicated by a numeral 1 in FIG. 4 and having a cross section as shown in FIG. 4 was obtained. The hollow portion 4 of the grip portion 2 of the handle-shaped molded article made up about 24% of the entire volume of the handle-shaped molded article. The grip portion had an excellent appearance. Neither a sink mark nor distortion was observed. Neither did the pressurized gas flow back into the fitting portion. The fitting portion 3 satisfied a required strength.

EXAMPLE 2

A handle-shaped molded article was produced in the same manner as in Example 1 except that the injection pressure was changed. That is, after the injection of the molten resin was finished, a nitrogen gas having a gage pressure of 30 kg/cm$^2$ was introduced into the cavity 60 through the gas inlet 48. At this time, a gage pressure of 3.0 kg/cm$^2$ was applied to the injection cylinder 22. The ram ratio was 13.3, and the injection pressure was 39.9 kg/cm$^2$(=3.0×13.3). In this case, the injection pressure/pressurized gas pressure ratio was 1.33(=39.9/30). As a result, a hollow portion was formed in the grip portion.

With a gage pressure of 3.0 kg/cm$^2$ applied to the hydraulic injection cylinder 22, then, a nitrogen gas was further introduced, and at the same time, the pressure of the nitrogen gas was increased up to a gage pressure of 75 kg/cm$^2$. In this case, the injection pressure/pressurized gas pressure ratio was 0.53(=3.0×13.3/75). While these conditions were being maintained, the molten resin was cooled and solidified. Then, the nitrogen gas pressure in the hollow portion was reduced to atmospheric pressure, and the handle-shaped molded article was taken out of the mold.

The grip portion of the above-obtained handle-shaped molded article had an excellent appearance. Neither a sink mark nor distortion was observed. Neither did the pressurized gas flow back into the fitting portion. The fitting portion satisfied a required strength.

EXAMPLE 3

Figure 5:
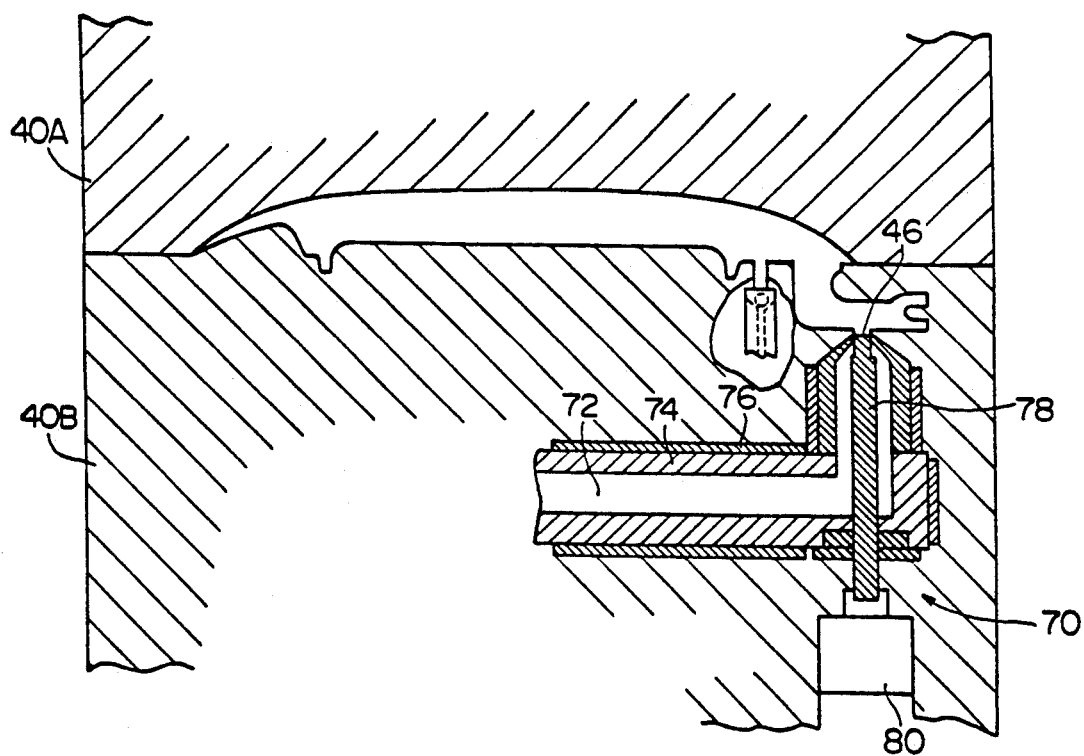
FIG. 5 is a partial cross-sectional view of a mold for use in another embodiment of the method of the present invention.

The mold 40 described in Example 1 was remodeled to a hot runner mold, and a valve gate 70 was made in the resin gate portion of the mold as shown in a partial cross-sectional view in FIG. 5. The resin gate 46 was openable and closable by means of the valve gate 70. In FIG. 5, numeral 72 indicates a hot runner portion, numeral 74 indicates a runner manifold, numeral 76 indicates a heater, numeral 78 indicates a shut-off pin, and numeral 80 indicates a hydraulic cylinder. The hydraulic cylinder 80 allows the shut-off pin 78 to open and close the rein gate 46.

With the valve gate 70 open, in the same manner as in Example 1, a molten resin in an amount of 64.0 cm$^3$, which was polycarbonate plasticized at a resin temperature of 290° C., was injected into the cavity 60 through the resin gate 46 to fully occupy the fitting portion-forming cavity zone and also occupy about 80 volume % of the grip portion-forming cavity zone. After the injection of the molten resin was so finished, the valve gate 70 was closed, and a nitrogen gas having a gage pressure of 30 kg/cm$^2$ was introduced into the cavity 60 through the gas inlet 48. As a result, a hollow portion was formed in the grip portion. Then, with the valve gate 70 closed, a nitrogen gas was further introduced, and at the same time, the gage pressure of the nitrogen gas was increased up to a gage pressure of 75 kg/cm$^2$. While these conditions were being maintained, the molten resin was cooled and solidified. Then, the nitrogen gas pressure in the hollow portion formed in the grip portion was reduced to atmospheric pressure, and a handle-shaped molded article was taken out of the mold.

The above-obtained handle-shaped molded article had the same cross-sectional structure as that of the molded article obtained in Example 1. The grip portion had an excellent appearance. Neither a sink mark nor distortion was observed. Neither did the pressurized gas flow back into the fitting portion. The fitting portion satisfied a required strength.

EXAMPLE 4

Figure 6:
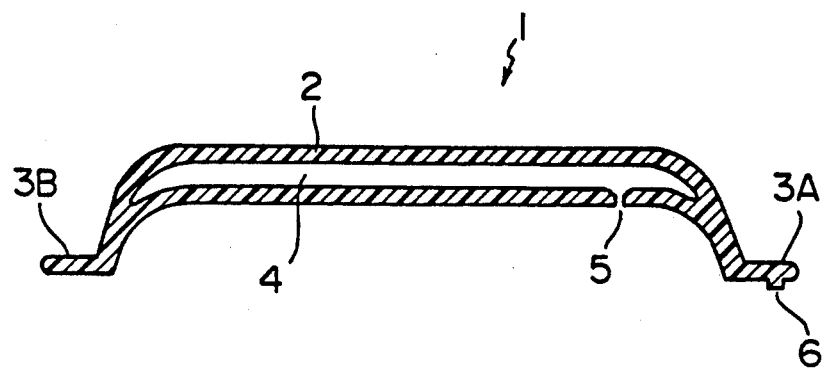
FIG. 6 is a cross-sectional view of a handle-shaped molded article produced according to another embodiment of the method of the present invention.

A thick handle-shaped molded article 1 having a volume of about 62.5 cm$^3$ and having a cross section as shown in FIG. 6 was produced. The grip portion made up about 85% (53.1 cm$^3$) of the entire volume of the handle-shaped molded article, and the total volume of the fitting portions 3A and 3B was about 15% by volume (9.4 cm$^3$). The same injection molding apparatus as that shown in FIG. 1 was used. The mold used in this Example was substantially the same as the mold 40 shown in FIG. 1 except for the modification of the cavity form. In addition, a resin gate 46 was made in that portion of the mold where one fitting portion 3A was to be formed, and no resin gate was made in that portion of the mold where the other fitting portion 3B was to be formed. To introduce a gas into the grip portion-forming cavity zone, a gas inlet was made in that portion of the mold where the grip portion was to be formed.

A molten resin in an amount of 56.3 cm$^3$, which was polycarbonate plasticized at a resin temperature of 290° C., was injected into the cavity 60 through the resin gate 46 to occupy about 90% by volume of the cavity 60. After the injection of the molten resin was finished, a nitrogen gas having a gage pressure of 25 kg/cm$^2$ was introduced into the cavity 60 through the gas inlet 48. In this case, the gage pressure applied to an injection hydraulic cylinder 22 was set at a gage pressure of 4.88 kg/cm$^2$, and the injection pressure was set at 64.9 kg/cm$^2$(=4.88×13.3). In this case, the injection pressure/pressurized gas pressure ratio was 2.59(=64.9/25). Under these conditions, a hollow portion was formed in the grip portion.

While the pressure applied to the hydraulic injection cylinder 22 was being maintained at a gage pressure of 4.88 kg/cm$^2$, then, a nitrogen gas was introduced into the cavity 60, and at the same time, the nitrogen gas pressure was increased up to a gage pressure of 65 kg/cm$^2$. In this case, the injection pressure/pressurized gas pressure ratio was 1.00(=4.88×13.3/65). While these conditions were being maintained, the molten resin was cooled and solidified. Then, the nitrogen gas pressure in the hollow portion formed in the grip portion was reduced to atmospheric pressure, and the handle-shaped molded article was taken out of the mold.

Under the above injection molding method, the handle-shaped molded article 1 of which the cross-sectional structure is shown in FIG. 6 was obtained. The handle-shaped molded article 1 had the fitting portion 3A in one end of its grip portion 2 and the fitting portion 3B in the other end of its grip portion 2. The hollow portion 4 in the grip portion 2 of the handle-shaped molded article made up about 16% of the entire volume of the handle-shaped molded article. The grip portion 2 had an excellent appearance, and neither a sink mark nor distortion was observed. The amount of the molten resin injected before the introduction of the pressurized gas was greater than that in Example 1. Therefore, the molten resin was pushed into the other fitting portion 3B due to the introduction of the pressurized gas, and the other fitting portion 3B reliably had a solid structure.

COMPARATIVE EXAMPLE 1

The same mold as the mold used in Example 1 was prepared except that a resin gate was provided in the gas inlet position and a gas inlet was provided to introduce a gas through the resin gate. Then, a handle-shaped molded article was produced by means of the so-prepared mold and the same injection molding apparatus as that used in Example 1 in the same manner, and under the same conditions, as in Example 1. The resultant handle-shaped molded article showed a phenomenon of a meandrous mark starting from the resin gate-corresponding portion and remaining on the entire grip portion (jetting), and the appearance of the handle-shaped molded article was defective.

COMPARATIVE EXAMPLE 2

A handle-shaped molded article was produced with the same injection molding apparatus as that used in Example 1, in the same manner as in Example 1 and under the same conditions as those in Example 1 except for the following (A) and (B).

(A) After the injection of the molten resin was finished, a nitrogen gas having a gage pressure of 30 kg/cm$^2$ was introduced into the cavity 60 through the gas inlet 48, and at the same time, the pressure applied to the hydraulic injection cylinder 22 was set at a gage pressure of 0 kg/cm$^2$.

(B) Then, the nitrogen gas pressure was increased up to a gage pressure of 75 kg/cm$^2$, and during this period and during the cooling and solidification of the molten resin as well, the pressure applied to the hydraulic injection cylinder 22 was set at a gage pressure of 0 kg/cm$^2$.

Figure 7:
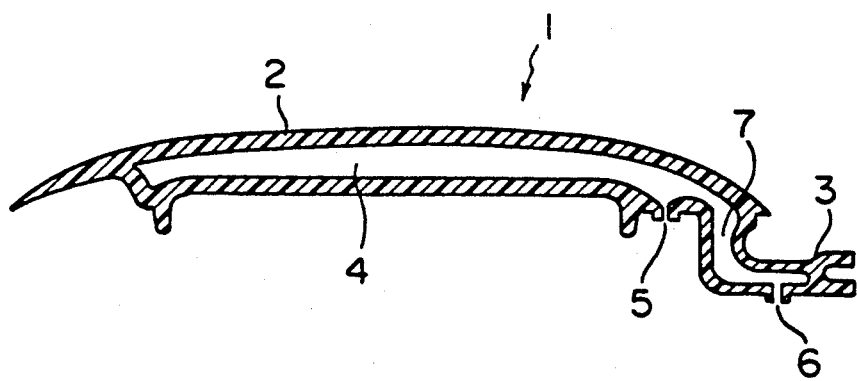
FIG. 7 is a cross-sectional view of a handle-shaped molded article produced in Comparative Example 2 which will follow later.

FIG. 7 shows the cross section of the above-obtained handle-shaped molded article. The appearance of the handle-shaped molded article as a whole and the form of the hollow portion formed in that portion of the grip portion which was positioned on the left hand side from the gas inlet-corresponding portion 5 in FIG. 7 were the same as those of the handle-shaped molded article obtained in Example 1. However, the hollow portion also extended into the fitting portion on the right in FIG. 7 and further into the a portion corresponding to the resin gate and being indicated by numeral 6 in FIG. 7. That is, the fitting portion had a hollow portion 7. As a result, the strength of the fitting portion 3 was insufficient.

As specified above, the fitting portion of the handle-shaped molded article has a solid structure and therefore exhibits high strength. Further, the grip portion of the handle-shaped molded article has a hollow portion and therefore decreases the weight of the handle-shaped molded article. Moreover, since the molten resin forming the grip portion surface is pressed to the internal surface of the mold while the molten resin is cooled and solidified, a sink mark and distortion on the grip portion can be prevented. Further, since the molten resin is filled in the fitting portion-forming cavity zone, and, continuously, in at least part of the grip portion-forming zone of the cavity, jetting and a flow mark on the grip portion can be prevented. Therefore, the grip portion has a smooth surface and an excellent appearance.

The gas pressure in the gas inlet was maintained at a predetermined value until the completion of cooling and solidification of the molten resin while the injection pressure is maintained at a predetermined value or while the resin gate is mechanically closed. Therefore, a pressure is exerted on the solid-structured fitting portion of the handle-shaped molded article. Consequently, a pressure is exerted on the resin from the interior of the resin in the fitting portion to the internal surface of the mold. Therefore, the fitting portion is free from distortion and a residual strain. Therefore, the handle-shaped molded article can be excellently plated at a later step.

The present invention can greatly decreases the time required for the molding.

What is claimed is:

1. A method for producing a handle-shaped molded article having a thick grip portion having a hollow structure and at least one thick fitting portion having a solid structure by injection molding by means of an injection molding apparatus equipped with a mold having a cavity, a resin gate provided where the fitting portion of the handle-shaped molded article is to be formed and a gas inlet provided where the grip portion of the handle-shaped molded article is to be formed, which comprises:

injecting a molten resin into the cavity through the resin gate, thereby filling molten resin in a fitting portion-forming cavity zone formed of that portion of the mold where the resin gate is provided and the fitting portion is to be formed and further filling molten resin in part of the rest of the cavity, introducing a pressurized gas into the cavity through the gas inlet while maintaining an injection pressure, P, at a predetermined value, the injection pressure, P, being defined by $P = F/S$ wherein F is an injection force and S is a cross-sectional area of a screw of the injection molding apparatus, and maintaining the injection pressure for exerting a pressure on the resin in the fitting portion-forming cavity zone and a gas pressure in the gas inlet at predetermined values until the molten resin is cooled and solidified.

2. A method according to claim 1, wherein the injection pressure is maintained at 0.5 or more times the gas pressure in the gas inlet during a time from initiation of the introduction of the pressurized gas to completion of cooling and solidification of the molten resin.

3. A method according to claim 2, wherein the injection pressure is maintained at 0.5 to 2.5 times the gas pressure in the gas inlet during a time from initiation of the introduction of the pressurized gas to completion of cooling and solidification of the molten resin.

4. A method according to any one of claims 1 to 3, wherein the introduction of the pressurized gas into the cavity through the gas inlet is initiated after the molten resin has been injected in an amount corresponding to $0.3 \times (V_t - V_1)$ in which $V_t$ is a total volume of the molten resin to be injected and $V_1$ is the volume of the fitting portion-forming cavity zone.

5. A method for producing a handle-shaped molded article having a thick grip portion having a hollow structure and at least one thick fitting portion having a solid structure by injection molding by means of an injection molding apparatus equipped with a mold having a cavity, a resin gate provided where the fitting portion of the handle-shaped molded article is to be formed and a gas inlet provided where the grip portion of the handle-shaped molded article is to be formed, which comprises:

injecting a molten resin into the cavity through the resin gate, thereby filling molten resin in a fitting portion-forming cavity zone formed of that portion of the mold where the resin gate is provided and the fitting portion is to be formed and further filling molten resin in part of the rest of the cavity, mechanically closing the resin gate, then introducing a pressurized gas into the cavity through the gas inlet, and maintaining a gas pressure in the gas inlet at a predetermined value, with the resin gate mechanically closed, until the molten resin is cooled and solidified.

6. A method according to claim 5, wherein the resin gate is mechanically closed with a valve gate.

7. A method according to claim 5 or 6, wherein the introduction of the pressurized gas into the cavity through the gas inlet is initiated after the molten resin has been injected in an amount corresponding to $0.3 \times (V_t - V_1)$ in which $V_t$ is a total volume of the molten resin to be injected and $V_1$ is the volume of the fitting portion-forming cavity zone.

* * * * *

UNITED STATES PATENT AND TRADEMARK OFFICE
CERTIFICATE OF CORRECTION

PATENT NO. : 5,308,574
DATED : May 3, 1994
INVENTOR(S) : Kunio Yamazaki, et. al.

It is certified that error appears in the above-indentified patent and that said Letters Patent is hereby corrected as shown below:

Title page, item [54], and col. 1, line 1, change "AIR to --GAS--.

Signed and Sealed this

Twentieth Day of September, 1994

Attest:

BRUCE LEHMAN

Attesting Officer     Commissioner of Patents and Trademarks